Aug. 31, 1948.　　A. W. STAAB ET AL　　2,448,331
REPAIR JIG FOR AUTOMATIC RECORD CHANGERS
Filed Jan. 3, 1946　　2 Sheets-Sheet 1

Inventor
ALVIN W. STAAB
OSCAR A. WANDEN

By Clarence A. O'Brien
and Harvey B. Jacobson
Attorneys

Aug. 31, 1948.   A. W. STAAB ET AL   2,448,331
REPAIR JIG FOR AUTOMATIC RECORD CHANGERS
Filed Jan. 3, 1946   2 Sheets-Sheet 2
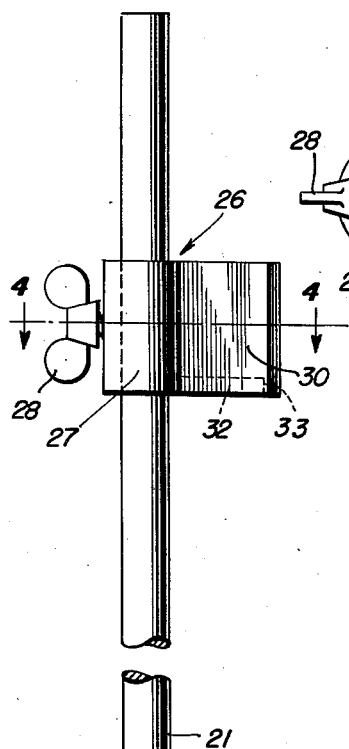
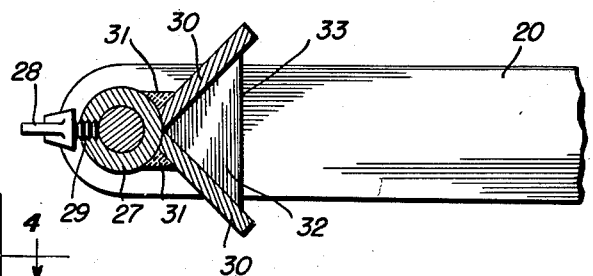
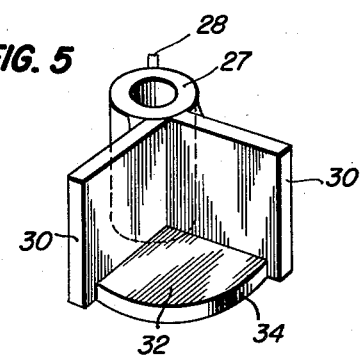
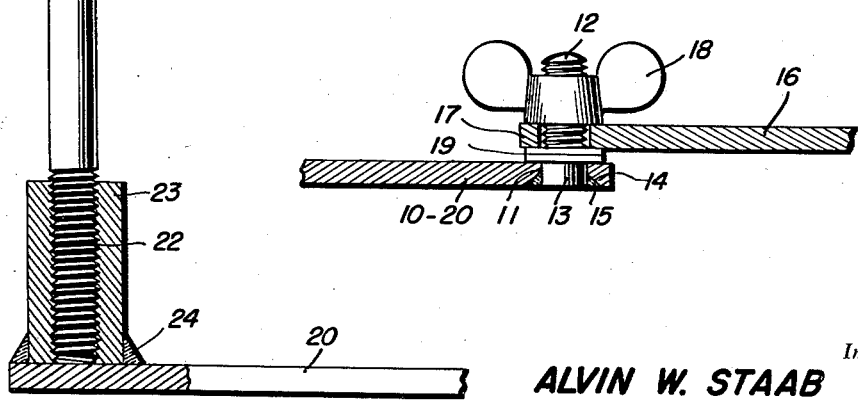
*Inventor*
ALVIN W. STAAB
OSCAR A. WANDEN
By *Clarence A. O'Brien*
*and Harvey B. Jacobson*
*Attorneys*

Patented Aug. 31, 1948

2,448,331

UNITED STATES PATENT OFFICE 2,448,331

REPAIR JIG FOR AUTOMATIC RECORD CHANGERS

Alvin W. Staab and Oscar A. Wanden, Milwaukee, Wis.

Application January 3, 1946, Serial No. 638,857

4 Claims. (Cl. 29—288)

This invention relates to a repair jig for automatic record changers, radio receiver chassis, and allied equipment to facilitate the repair of such devices by supporting the same during repair services, so that the same will be accessible from all sides, including the top and bottom, thereby greatly facilitating the repair work.

It is an object of the invention to provide a repair jig for supporting automatic record changers, radio chassis and allied equipment of various sizes and proportions, firmly and to render the device adjustable for various sizes, shapes and dimensions of equipment as made by manufacturers.

Another object of the invention is to provide a jig which is constructed for the purpose of supporting and holding in workable position regardless of size, shape or dimensions, and design, automatic record changers, radio receiver chassis and allied equipment, within ordinary limitations, and which has extreme adaptability and flexibility in its adjustment to accommodate any and all sizes, shapes and designs such as, round, square, triangular, rectangular, elliptical, etc., and will also accommodate equipment of various heights or lengths due to the independent adjustment of the legs and clamps thereof, and which can be easily applied and removed.

A still further object of the invention is to so support the equipment that the degree of vision is increased, in that the mechanism may be viewed both at the top and bottom which allows adjustment of the mechanism at one and the same time, and will accommodate record changers and receivers or other equipment in workable position, either upright or up-side down to allow for convenience in the repair and adjustment.

Other objects and advantages reside in the details of construction and operation as more fully hereinafter described and claimed, reference being had to the accompanying drawings forming part hereof, wherein like numerals refer to like parts throughout, and in which:

Figure 3 is an enlarged sectional elevation showing one of the corner rods, legs or upright posts forming supports for a record changer with a chassis supporting bracket thereon.

Figure 4 is a sectional view taken on a line 4—4 of Figure 3.

Figure 5 is a perspective view of a modified form of bracket from that shown in the other views, and Figure 6 is a sectional elevation showing a connection between two of the arms or links of the jig.

Figure 1:
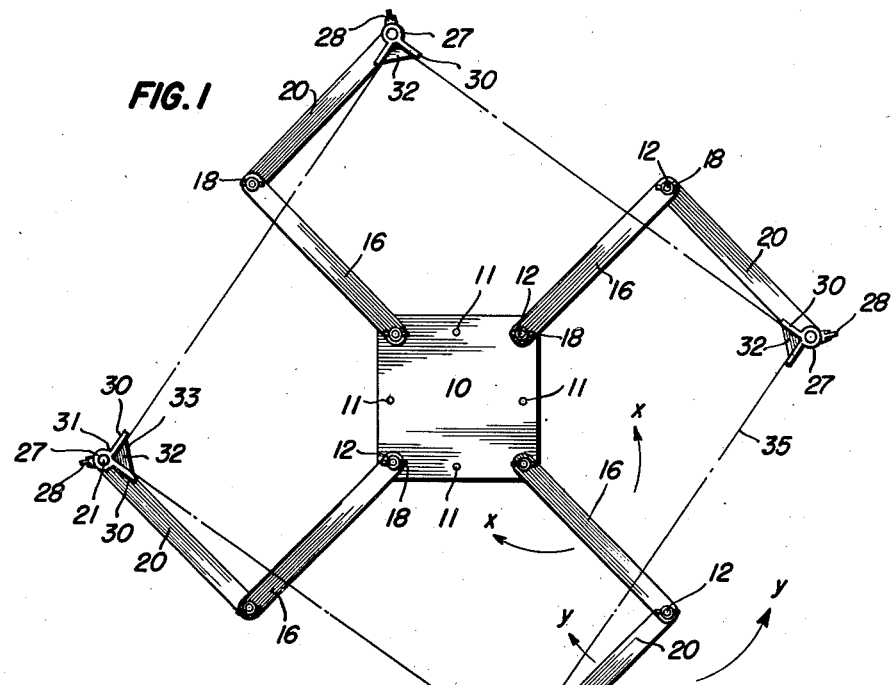
Figure 1 is a plan view of the jig, showing the same in use for supporting a radio chassis indicated in dotted lines.

Referring to the drawings in detail, in which like reference characters designate corresponding parts throughout the several views, the repair jig is shown as comprising a base 10 consisting of a plate of metal or other suitable material of rectangular or square outline with sufficient thickness to give weight enough to prevent the same from overturning and provided with spaced vertical holes 11 at the corners thereof and at intermediate points of the side edges. This plate may be of any suitable size, such as 5" x 5" x $\frac{3}{16}$" or otherwise and where measurements are given, it is not desired to limit the same thereto but merely as suggestive. Attached to each corner of the plate or at the intermediate holes 11 are threaded studs 12, the same as shown in Figure 6 of the drawings, the portions of the base around the studs at the unthreaded portions 13 being countersunk at 14 to permit welding as indicated at 15 although this may be formed in the top instead of the bottom surface, if desired. The intermediate holes, may be used to facilitate attachment and mounting of the base plate to a table or bench to secure the same in working position. Mounted on the studs 12 so as to swing are inner links or arms 16 which may be swung in any direction, as indicated by the arrows X in Figure 1 of the drawings. The ends of the arms or links 16, which are formed of a piece or bar of metal, are provided with holes or apertures 17 to engage over the studs 12, after which the same are held by wing nuts 18 so as to be loosened and permit the arms to swing, or to clamp the same firmly in adjusted position. Washers or flanges 19 may be provided between the arms and the base plate to form a desirable bearing for the arms.

Both ends of the arms 16 are provided with the holes or apertures 17.

Figure 2:
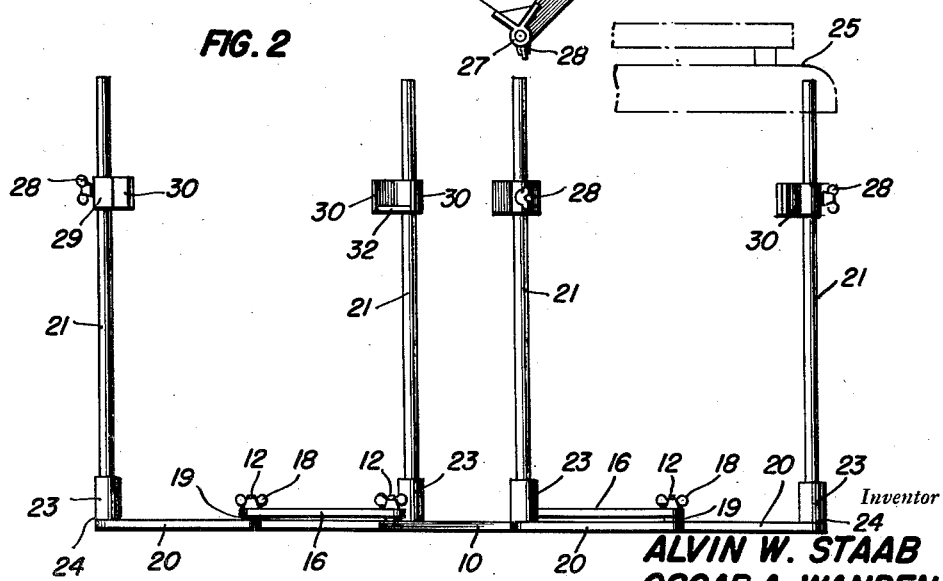
Figure 2 is a side elevation thereof and indicating the same in use for supporting a record changer.

In addition to the inner links 16, outer links 20 are provided, and at the inner ends thereof are provided with studs 12 like the base 10 similarly secured in position and engaging the holes 17 in the outer ends of the arms 16 for pivotal movement of the links 20 with respect to the links 16 in the manner indicated by arrows Y in Figure 1 of the drawings. Thus, it will be noted that the arms 16 are placed on a level above the plane or level of the base plate 10 and the arms 20 which are disposed in the same horizontal plane. The arms 16 and 20 are of corresponding sections or strips of metal and of the same dimensions, though they may vary, such as 7" x 1⅜" x 3/16" without limitation thereto. On the outer or free ends of the arms 20, upright supports 21 are provided in the form of rods or bar metal, having threaded lower ends 22 which are engaged and vertically adjustable in internally threaded sockets 23 in the form of internally threaded ferrules or sleeves which are welded to the extremities or on the free or outer ends of the arms 20, as indicated at 24 or otherwise rigidly secured thereto in upright positions. Thus, when the device is adjusted as shown in Figures 1 and 2, the upper ends of the rods may be used to engage holes or sockets in the lower portions of a record changer, a fragmentary portion of which is generally indicated at 25 in Figure 1 of the drawings by dot and dash outline. In this way, the record changer or other equipment, especially automatic record changers, will be supported so as to render the same accessible and visible from all sides and at the top and bottom for convenient and accessible, efficient repair and adjustment, and may be supported regardless of the size and shape thereof within certain limitations, which is made possible by the adjustable legs, clamps and arms as specified. Also, such equipment may be supported upright or upside down to allow for convenience in the repair and adjustment of the parts.

For supporting radio receiver chassis and other allied equipment of various sizes and shapes or dimensions, including designs which are round, square, triangular, rectangular, elliptical etc., and to accommodate equipment of various heights and lengths due to said adjustments, supporting brackets 26 are adjustably mounted on the posts or rods 21. These brackets may be mounted on the rods for vertical adjustment, the rods being ⅜" diameter by 14" long plus or minus, or angular or other shapes so as to allow for considerable adjustment up and down. The brackets comprise sleeve portions 27 which may be secured in set position vertically of the rods by means of set screws or other clamping means 28 shown threaded through the sleeve as indicated at 29 by means of the threaded shanks thereof. The sleeves are provided with angularly related wings 30 extending vertically at right angles to each other, acute angles or otherwise and formed integral with the sleeves 27 or welded thereto as indicated at 31 so as to be rigid therewith and provided with bottom wings or web portions 32 extending between the vertical portions 30 and having its front edge 33 terminating short of the end of the wings or vertical portions 30 as more particularly illustrated in Figure 4 of the drawings. In this form, the edges 33 are straight, but may be arcuate or convexly curved as indicated at 34 in Figure 5 of the drawings, which shows a modification of the bracket structure. Like the form shown in Figure 4, the curved edges 34 also terminate in spaced relation to the ends of the vertical wings or portions 30 to improve the handling of large and heavy radio chassis, as the additional lips of the projecting portions give better support. The manner of supporting the chassis indicated at 35 in Figure 1 of the drawings in dot and dash lines, is symbolic of the manner of supporting other equipment such as specified, with the corners thereof resting within the brackets 26 and resting upon the horizontal wings or bottom portions formed by the webs 32. In either case, the brackets 26 may be adjusted vertically on the uprights 21 so as to be raised or lowered as desired. The adjustment of the arms or links 16 and 20 will permit the variation of the lengths thereof and the extension from the base, to support chassis, record changers and other equipment of different sizes and shapes as heretofore pointed out, while permitting a maximum degree of vision and accessibility for repair and adjustment of the mechanism both at the top and bottom. This will include frequency modulation radio receiver chassis, facsimile, television, marine and aviation receivers. The jig will therefore improve and advance the art of servicing and maintaining the above types of equipment due to its accessibility and simplicity of design.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

We claim:

1. A repair jig for automatic record changers, radio chassis and other equipment, including a base, horizontal arms pivotally mounted on the corners of the base, means to clamp the arms in adjusted position, other horizontal arms pivoted to the extremities of the first named arms, means to clamp the latter arms in adjusted position, uprights removably mounted on the extremities of the second named arms, and brackets mounted for vertical adjustment on the uprights.

2. A repair jig for automatic record changers, radio chassis and other equipment, including a base, arms pivotally mounted on vertical axes to the corners of the base, means at said points to clamp the arms in adjusted position, other arms pivoted on vertical axes to the extremities of the first named arms, means at said latter pivots to clamp the latter arms in adjusted position, uprights removably mounted on the extremities of the second named arms, and brackets adjustably mounted on the uprights, said brackets comprising sleeves adjustably mounted on the uprights and having angular side wings and bottom web portions therebetween for supporting the equipment thereon, said bottom portions terminating short of the ends of the wing portions.

3. A repair jig of the class described, including a rectangular base having corner openings, studs secured in said openings, arms having holes pivotally mounted for horizontal swinging movement over the studs, nuts on said studs clamping the arms in position when adjusted, other arms having similar studs at their inner ends engaged through openings in the outer ends of the first arms, wing nuts on said studs for clamping said arms angularly with respect to each other when swung in horizontal planes, threaded sockets at the outer ends of the second named arms, and vertical rods threaded into said sockets.

4. A repair jig of the class described, including a rectangular base having corner openings, studs secured in said openings, arms having holes pivotally mounted for horizontal swinging movement over the studs, nuts on said studs clamping the arms in position when adjusted, other arms having similar studs at their inner ends engaged through openings in the outer ends of the first arms, wing nuts on said studs for clamping said arms angularly with respect to each other when swung in horizontal planes, threaded sockets at the outer ends of the second named arms, vertical rods threaded into said sockets and supporting brackets vertically slidable on the rods and having means to clamp the same to the rods in vertically adjusted positions, said brackets having side portions and bottom portions therebetween and sleeve portions slidable on the rods.

ALVIN W. STAAB.
OSCAR A. WANDEN.

REFERENCES CITED

The following references are of record in the file of this patent:

UNITED STATES PATENTS

| Number | Name | Date |
|---|---|---|
| 288,035 | Dixon | Nov. 6, 1883 |
| 307,178 | Carter | Oct. 28, 1884 |
| 546,421 | Duke | Sept. 17, 1895 |
| 574,529 | Elliott | Jan. 5, 1897 |
| 911,567 | Berkowitz | Feb. 9, 1909 |
| 1,833,010 | Willy | Nov. 24, 1931 |

FOREIGN PATENTS

| Number | Country | Date |
|---|---|---|
| 8,150 | Great Britain | Apr. 4, 1906 |